United States Patent [19]

Samofalov et al.

[11] 3,798,619

[45] Mar. 19, 1974

[54] PIEZOELECTRIC TRANSDUCER MEMORY WITH NON-DESTRUCTIVE READ OUT

[76] Inventors: Konstantin Grigorievich Samofalov, ulitsa Vandy Vasileveskoi, 10, kv. 52; Tatyana Vasilievna Gruts, prospekt Vossoedinenia 20/2, kv. 61; Jury Pavlovich Zaika, ulitsa Pirogova, 2, kv. 166; Valery Alexandrovich Manzhelo, ulitsa Scherbakova, 36, kv. 25/1; Vladimir Alexandrovich Zavadsky, ulitsa Vyborgskaya, 2/4; Leonid Sergeevich Voskrekasenko, Rusanovskaya Naberezhnaya, 12, kv. 38, all of Kiev, U.S.S.R.

[22] Filed: Oct. 24, 1972

[21] Appl. No.: 300,241

[52] U.S. Cl. .............................................. 340/173.2

[51] Int. Cl. ..... G11c 11/22, G11c 5/06, G11c 7/02

[58] Field of Search .................................. 340/173.2

[56] References Cited

UNITED STATES PATENTS

| | | | |
|---|---|---|---|
| 3,537,079 | 10/1970 | Feisel | 340/173.2 |
| 3,423,654 | 1/1969 | Heilmeier | 340/173.2 |
| 3,104,377 | 9/1963 | Alexander | 340/173.2 |
| 3,142,044 | 7/1964 | Kaufman | 340/173.2 |
| 3,426,255 | 2/1969 | Heywang | 340/173.2 |

OTHER PUBLICATIONS

Chang, Nonvolatile Schottky Diode with Barrier Height Controlled by Ferroelectric Polarization, IBM Technical Disclosure Bulletin, Vol. 14, No. 4, 9/71, pp. 1250–1251.

*Primary Examiner*—Bernard Konick
*Assistant Examiner*—Stuart Hecker
*Attorney, Agent, or Firm*—Holman & Stern

[57] ABSTRACT

A memory device is disclosed for long-term storage and non-destructive reading of information designed as a strip of a ferroelectric material, which comprises storage cells including at least two piezoelectric transducers. The piezoelectric transducers are made on the basis of sections of said strip of ferroelectric material which acquires piezoelectric properties when affected by an electric field. Input piezoelectric transducers contain excitation electrodes and screening electrodes located on opposite flat surfaces of said strip, which are fed with read signals. Output piezoelectric transducers contain electrodes forming discharge lines and write electrodes located on opposite flat surfaces of said strip which are fed with write signals.

3 Claims, 7 Drawing Figures

PIEZOELECTRIC TRANSDUCER MEMORY WITH NON-DESTRUCTIVE READ OUT

BACKGROUND OF THE INVENTION

The invention relates generally to automatic control and computer means used for data storage and, in particular, it relates to memory devices and can be employed for long-term storage and non-destructive reading of information presented in the form of multi-digital binary codes.

Known in the art are memory devices intended to store binary codes in which data recording is provided due to the effect an electric field produces in a ferroelectric material.

Such a device has a multi-layer monolithic design consisting of separate ferroelectric strips which obtain piezoelectric properties under the effect of an electric field, and storage cells comprising two piezoelectric transducers, excitation electrodes of the storage cells, screening electrodes and electrodes which form discharge lines, the excitation electrodes being located between two adjacent strips the external surfaces of which carry screening electrodes bordering the plates whose external surfaces carry the discharge line electrodes.

A disadvantage of the known memory devices consists in that they are difficult to manufacture since their design requires that a number of ferroelectric strips form a monolithic structure.

Another disadvantage of such devices is their poor reliability since the bonds between individual strips are liable to damage.

Still another disadvantage is that these devices have low noise immunity caused by the fact that write electrodes are combined with screening electrodes within a common structure, as well as by the fact that a mechanical stress wave produced by the input transducers of one storage cell after excitation can excite the output transducers of the other storage cells due to which the input signal will reach the output by-passing the storage cell.

One more disadvantage consists in that the known memory devices comprise components with reactive output impedance.

SUMMARY OF THE INVENTION

Therefore, an object of the preset invention is to provide a memory device which is sufficiently easy to manufacture.

Another object is to provide a noise-proof memory device.

Still another object of the present invention is to provide a memory device whose components have an active output impedance.

One more object of the present invention is to design a device with a sufficiently reliable structure.

With the above and other objects in view, the present invention consists in that it provides a memory device which is designed as a strip of a ferroelectric material acquiring piezoelectric properties under the effect of an electrical field and which comprises: storage cells which contain at least two piezo electric transducers; excitation electrodes of the storage cells located on one surface of said strip; write electrodes located on the same surface between the excitation electrodes and enveloped by them; screening electrodes located on the opposite surface of the strip; electrodes forming discharge lines which are enveloped by the screening electrodes and located on the same surface of the strip as the screening electrodes, the normal projections of discharge line electrodes onto the surface of the write electrodes being superimposed on all the write electrodes and the normal projections of the excitation electrodes onto the surface of the screening electrodes being superimposed on the latter.

The memory device can also have a layer of a semiconductor material placed onto said strip between discharge line forming electrodes and intended to interconnect said electrodes, the discharge line forming electrodes being combined in groups one of which is connected to write signal sources for each discharge line. Included in the device is also a power supply for every discharge line one pole of which is connected to said write signal source and the other pole is connected, via resistors, to another group of electrodes of said discharge line.

It is preferable that the memory device should comprise control electrodes located on the semiconductor layer, but isolated from it electrically and a decoder to which said control electrodes are connected.

BRIEF DESCRIPTION OF THE DRAWINGS

Other objects and advantages of the present invention will now be shown in the description of its embodiments given by way of example with reference to the accompanying drawings, in which.

DETAILED DESCRIPTION OF THE PREFERRED EMBODIMENT

Figure 1:
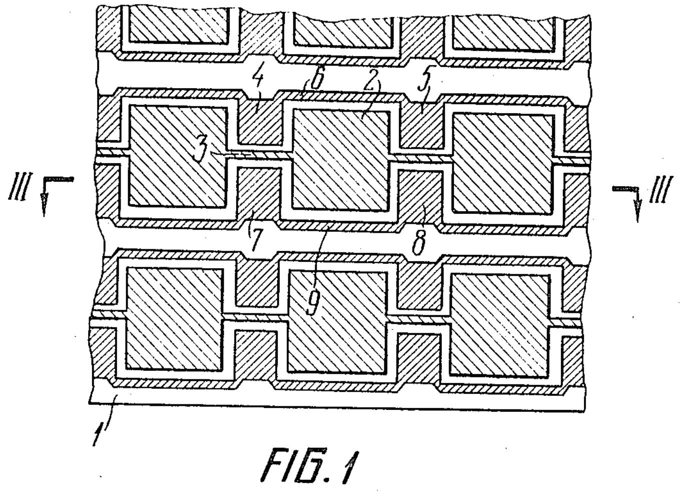
FIG. 1 shows a top view of a memory device according to the invention.

The memory device as shown in FIG. 1 is made on the basis of a strip 1 of a ferroelectric material such as a lead zirconate-titanate ceramics. Under the effect of an external electric field with the strength exceeding a certain value which is critical for the given material, the latter will acquire piezoelectric properties. Two opposite flat surfaces of the ferroelectric strip 1 carry electrodes made, for instance, as a thin metal conducting film. One of the surfaces of the strip 1 carries electrodes 2 which are interconnected by jumpers 3 and form write electrodes. Applied on to the same surface are electrodes 4 and 5 interconnected by a jumper 6 and electrodes 7 and 8 interconnected by a jumper 9 which form excitation electrodes. The latter envelope the write electrodes and are arranged parallel to them.

Figure 2:
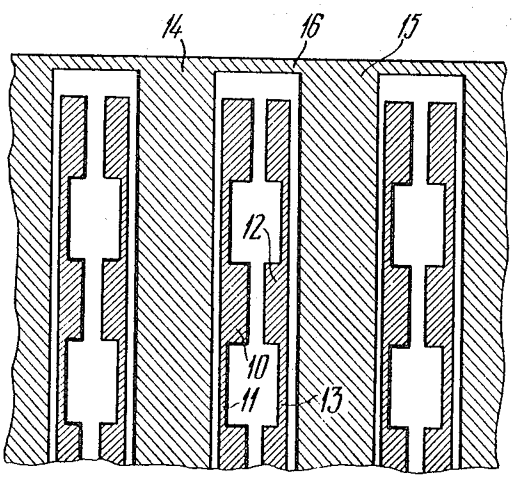
FIG. 2 is the same memory device according to the invention viewed from below.

The opposite surface of the strip 1 carries electrodes 10 (FIG. 2) interconnected by jumpers 11 and electrodes 12 interconnected by jumpers 13 forming a row of parallel two-wire discharge lines. Located between the discharge lines and parallel to them are electrodes 14 and 15 interconnected by jumpers 16 forming together screening electrodes which, in their turn, envelope the discharge lines.

Figure 3:
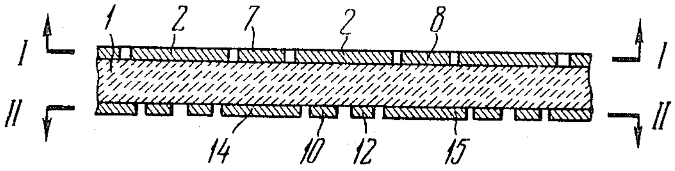
FIG. 3 is the same memory device according to the invention cut along the line III—III of FIG. 1.

The arrangement of electrodes in the memory device is shown in detail in FIG. 3 which presents the cross section of the strip 1. The electrodes 4 and 5 as well as similar electrodes 7 and 8 are arranged in such a way that their normal projections onto the opposite surface are superimposed on the electrodes 14 and 15. The electrodes 4,7 and 14 and electrodes 5,8 and 15 acting together with the material of the strip 1 form four input piezoelectric transducers of a single storage cell of the memory device. Similarly, the electrodes 10 and 12 forming the discharge lines are arranged on the strip 1 in such a way that their normal projections onto the surface of the electrodes 2 are superimposed on the latter. Thus, the interaction of the electrodes 10, 12 and 2 with the material of the strip 1 produces the effect of two output piezoelectric transducers of said storage cell.

Figure 5:
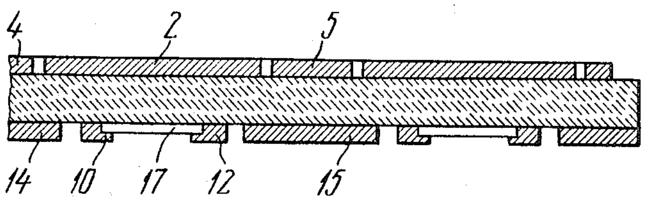
FIG. 5 is the same memory device according to the invention, cut along the line V—V of FIG. 4.
Figure 4:
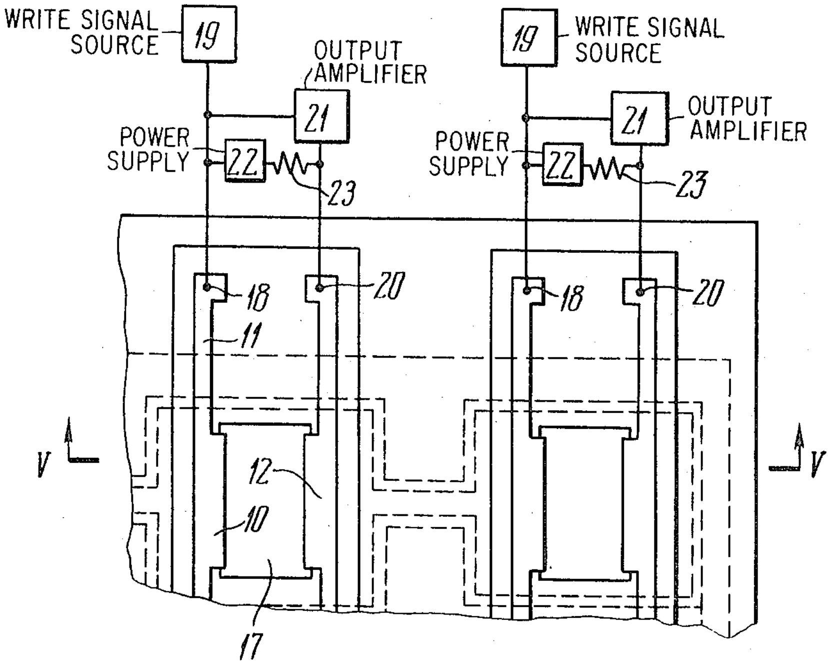
FIG. 4 is another embodiment of the memory device according to the invention viewed from below.

In another embodiment of the memory device shown in FIGS. 4 and 5 the electrodes 10 and 12 are interconnected electrically through a layer 17 of a semiconductor material. The function of this layer 17 can be performed by a thin film of tellurium. The layer 17 is located so that its normal projection onto the opposite surface of the strip 1 is superimposed on the electrode 2 without reaching beyond the boundaries of the latter.

The connections of the electrodes 10 and 12 that form the discharge lines is presented in the diagram of FIG. 4. The electrode 10 of every discharge line is coupled, via a jumper 11 and a contact zone 18, with a write signal source 19 to ensure the recording of binary codes in the storage cells. Connected to contact zones 18 and 20 of every discharge line is an output amplifier 21 which forms output signals derived from the storage cells that are being interrogated. The initial current to flow through the semiconductor layer 17 in every storage cell of the discharge line is produced by a power supply 22 which is connected to the electrode 12 via a resistor 23 and the contact zone 20 and to the electrode 10, via the contact zone 18.

Similar circuit arrangements are used to interconnect the write signal source 19 and the power supply 22 in every discharge line.

Figure 7:
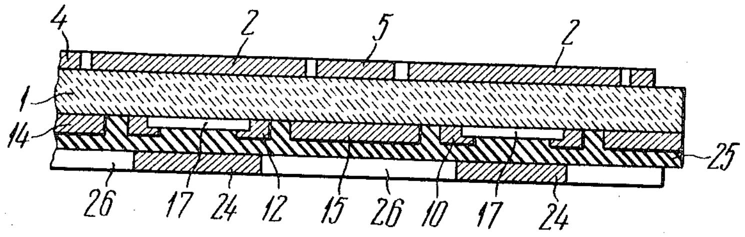
FIG. 7 is the same memory device according to the invention cut along VI—VI of FIG. 6.
Figure 6:
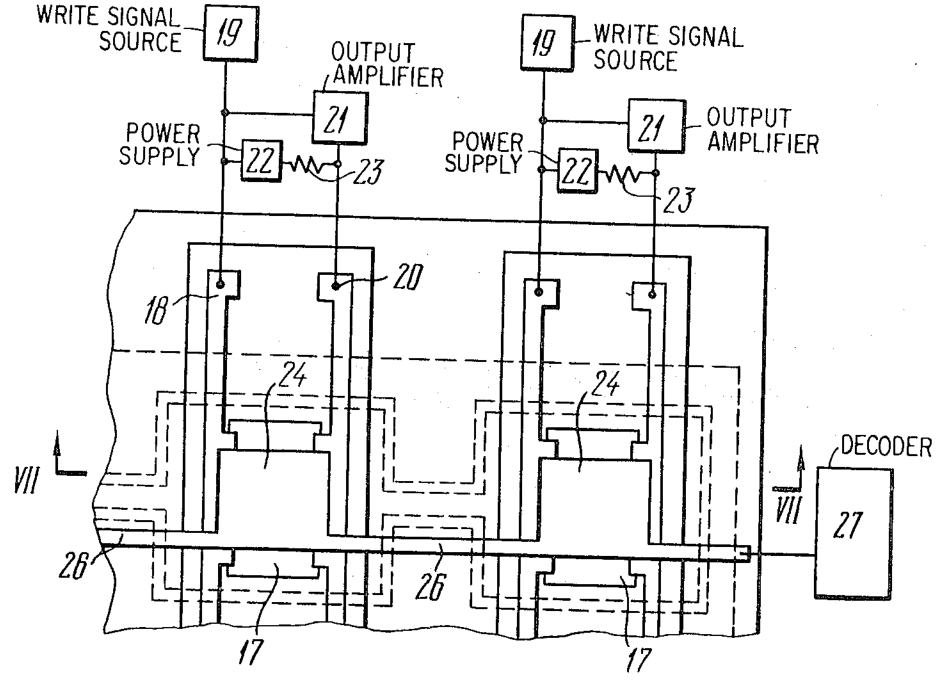
FIG. 6 shows still another embodiment of the memory device according to the invention viewed from below.

In a third embodiment of the memory device shown in FIGS. 6 and 7 the semiconductor layer 17 carries control electrodes 24 which are electrically isolated from the semiconductor layer with the aid of a layer 25 of an insulation material such as silicon dioxide. The control electrodes 24 are combined in groups with the use of jumpers 26 and every group of the control electrodes is connected to one of the outputs of a decoder 27.

The ferroelectric material of the strip 1 confined between the electrodes 4 and 7 and the electrode 14 as well as between the electrodes 5 and 8 and the electrode 15 acquires piezoelectric properties in the course of the device manufacture and during operation these properties remain unchanged.

The present memory device operates in the following way.

Write signals generated by the write signal source 19 affect the ferroelectric material confined between the electrodes 10 and 12 forming discharge lines and the electrodes 2 forming write electrodes and make the ferroelectric material acquire piezoelectric properties.

The piezoelectric properties of the ferroelectric material are characterized by the magnitude and the sign of the ratio between the electric charge change in the material and the change of the mechanical stress acting in it. The sign of the ratio depends on the vector direction of the electric field strength that produces piezoelectric properties in the material. The functions of write signals in the present device are performed therefore by the difference of potentials between the electrodes 10 and 12 and the electrodes 2. This potential difference produces an electric field in the ferroelectric material with the required vector direction. Thus, due to the piezoelectric properties similar variations of the mechanical stress in the ferroelectric material of the strip 1 will produce different-in sign-variations of the electric charge between the electrodes 10 and 12 and the electrode 2.

After write signals are fed to the electrodes 10 and 12 and to the electrodes 2, the state of every output piezoelectric tranducer formed by the combination of said electrodes 10, 12 and 2 and the ferroelectric strip 1 will be characterized by the sign of the ratio between the change of the interelectrode electric charge and the change of the mechanical stress in the material.

The sign of the ratio will depend on the digit of the binary code that is being recorded and the digit, in its turn, will determine the direction of the vector of the electric field produced by write signals in the bulk of the ferroelectric material.

A read signal is a potential jump between the screening electrodes and the excitation electrodes. The effect produced by the read signal on the excitation electrodes 4,5,7 and 8 and on the screening electrodes 14 and 15 causes a change of the mechanical stress in the ferroelectric strip 1 which, together with said electrodes, forms input piezoelectric transducers of the storage cells. The change of the mechanical stress produced by the read signal is sensed by output piezoelectric transducers of the storage cells. These mechanical stress variations cause changes in the electrical charge of the ferroelectric material of the output transducers. The latter changes, in their turn, result in a change of the potential difference between the electrodes 10 and 12 forming discharge lines and the electrodes 2 forming write electrodes.

Read signals affecting the material of the strip 1, and more particularly, the area of the input transducers of storage cells produce similar changes in the mechanical stress. As pointed out above, a change of the electrical charge in the ferroelectric material of the output transducers depends upon the write signal that has arrived earlier. Thus, the sign of change of the potential difference between the discharge line electrodes 10 and 12 and the write electrodes 2 will depend upon the binary digit that has been recorded.

In case the functions of read signals are performed by voltage pulses fed to the excitation electrodes of the storage cells, the discharge line outputs will produce voltage pulses whose polarity is determined by the write signals fed to these discharge lines before.

The output impedance of the storage cells in the device described above is capacitive. Hence, it is difficult to match the impedances of the discharge lines formed by the electrodes 10 and 12 to those of amplifiers 21 connected to said electrodes. The output impedance of the storage cells is made ohmic with the aid of the semiconductor layer 17 applied to the strip 1 and interconnecting the electrodes 10 and 12. The semiconductor layer 17 of each discharge line carries an electric current whose magnitude is determined by the voltage of the power supply 22, the resistor 23 and the resistance of the semiconductor layer 17. The resistance of the layer 17 depends on the physical parameters of the given semiconductor material and in particular on the concentration of free charge carriers in it. The concentration of free charge carriers in the semiconductor layer applied onto the surface of the ferroelectric strip depends on the magnitude and the sign of the surface charge of the ferroelectric material. The change of this charge is caused by the change of the mechanical stress in the material of the output piezoelectric transducer, the sign of the electric charge change being determined by the binary digit that has been recorded earlier.

The read signal will change the current flowing through the semiconductor layer 17. The sign of the current change and consequently that of the voltage between the electrodes 10 and 12 forming every discharge line will be determined by the write signals that have arrived earlier from the write signal source 19.

Thus, in contrast to the output signal represented by a change of the charge in the capacitance of the output piezoelectric transducer without the semiconductor layer, the output signal appearing at the electrodes 10 and 12 forming discharge line will be represented by a change of the current flowing through the semiconductor layer 17.

In the herein disclosed memory device, the output of every discharge line contains an electrical noise signal caused by the excitation of the piezoelectric transducers of those storage cells which have not been fed with read signals. These output transducers are excited by a mechanical stress wave propagating through the bulk of the ferroelectric strip 1.

This wave appears due to the excitation of input piezoelectric transducers belonging to the group of storage cells which have been fed with the read signal.

As pointed out above, the output signal of the storage cell is represented by a change in the electric current flowing through the semiconductor layer 17 due to a change in the concentration of free charge carriers. If the semiconductor layer 17 is affected by an external electric field the strength of which is sufficient to bind free electrons (the semiconductor layer becomes deplete) a change in the surface charge of the ferroelectric strip in the area of the output transducers will not result in a change in the current flowing through the semiconductor layer 17. This electric field is produced by control electrodes 24. The decoder 27 selects those groups of the control electrodes 24 which correspond to the storage cells which are not excited by the read signal and feeds the control electrodes 24 with a voltage required to drive the semiconductor layer 17 to depletion.

Thus, the input of the amplifier 21 is fed with the signal only from that storage cell which has been affected by a read signal.

The memory device described above can be used for long-time storage and nondestructive reading of information recorded in the form of multi-digit binary codes.

When used in automatic instruments and computer systems, this device makes it possible to reduce their weight, size and cost as well as to increase the reliability of their operation and the speed of information reading.

What we claim is:

1. A memory device made as a strip of a ferroelectric material comprising: a ferroelectric strip which acquires piezoelectric properties under the effect of an electric field; storage cells including at least two piezoelectric transducers using sections of said ferroelectric strip; excitation electrodes of said storage cells being disposed on one flat surface of said strip and fed with a read signal; write electrodes being disposed on the same surface of said strip between said excitation electrodes, said write electrodes being enveloped by said excitation electrodes which receive said write signals; screening electrodes being disposed on the opposite flat surface of said strip and being coincident with normal projections of said excitation electrodes onto the same surface and intended, together with the excitation electrodes, to receive the read signal; electrodes forming discharge lines, enveloped by said screening electrodes and disposed on the same flat surface of said strip as said screening electrodes, said discharge line forming electrodes coinciding with normal projections of said write electrodes onto this surface and being intended, together with said write electrodes, to receive write signals; input piezoelectric transducers comprising: a part of said ferroelectric strip which acquire piezoelectric properties in the course of manufacture, said excitation electrodes and said screening electrodes; and output piezoelectric transducers disposed between the input piezoelectric transducers and which comprise a part of said ferroelectric strip, said write electrodes and said discharge lines forming electrodes.

2. A memory device as claimed in claim 1, further comprising: a layer of a semiconductor material applied onto said strip of the ferroelectric material between said electrodes forming discharge lines, the layer serving to interconnect electrically said discharge line electrodes and to ensure that the output impedance of each said output transducer is ohmic, while said discharge line electrodes are combined in groups one of which is connected to write signal sources for each discharge line; a power supply for each said discharge line one pole of which is connected to said write signal source and the other pole of which is connected to another group of electrodes of said discharge line to ensure the required current flow through said semiconductor layer; and resistors for each said power supply serving to connect said other pole of said power supply to said other electrodes of said discharge line.

3. A memory device as claimed in claim 2, further comprising control electrodes disposed on said semiconductor layer and isolated from the latter which electrodes serve to generate an electric field in said semiconductor layer; a layer of an insulation material placed between said semiconductor layer and said control electrodes; and a decoder connected to all of said control electrodes serving to feed the latter with a potential corresponding to a selected address.

* * * * *